United States Patent
Wang et al.

(10) Patent No.: US 10,162,488 B1
(45) Date of Patent: Dec. 25, 2018

(54) BROWSER-BASED MEDIA SCAN

(71) Applicant: Amazon Technologies, Inc., Reno, NV (US)

(72) Inventors: Zhao Yuan Wang, Sunnyvale, CA (US); Arshia Khan, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 432 days.

(21) Appl. No.: 14/034,079

(22) Filed: Sep. 23, 2013

(51) Int. Cl.
*G06F 15/16* (2006.01)
*G06F 3/0484* (2013.01)
*G06F 3/0486* (2013.01)

(52) U.S. Cl.
CPC .......... *G06F 3/0484* (2013.01); *G06F 3/0486* (2013.01)

(58) Field of Classification Search
CPC ....................................................... G06Q 30/02
USPC ......................................................... 709/203
See application file for complete search history.

(56) References Cited

U.S. PATENT DOCUMENTS

| | | | | |
|---|---|---|---|---|
| 7,310,629 B1* | 12/2007 | Mendelson | ......... | G06F 17/3002 |
| 7,444,388 B1* | 10/2008 | Svendsen | ................ | G06F 15/16 707/999.2 |
| 8,385,950 B1* | 2/2013 | Wagner | ................... | H04L 67/06 455/414.2 |
| 8,473,585 B1* | 6/2013 | Smith | ................ | H04L 67/1097 709/218 |
| 2005/0102381 A1* | 5/2005 | Jiang | ..................... | H04W 12/08 709/220 |
| 2009/0063699 A1* | 3/2009 | Chapweske | ........ | H04N 7/17318 709/233 |
| 2010/0131346 A1* | 5/2010 | Morgan | ................. | G06Q 30/02 705/14.25 |
| 2010/0162126 A1* | 6/2010 | Donaldson | ........ | G06F 17/30902 715/738 |
| 2011/0107436 A1* | 5/2011 | Cholas | ............... | H04N 21/2541 726/29 |
| 2011/0314269 A1* | 12/2011 | Stavrou | ............... | G06F 21/6209 713/150 |
| 2012/0109997 A1* | 5/2012 | Sparks | .............. | G06F 17/30029 707/769 |
| 2014/0130149 A1* | 5/2014 | Tripp | .................... | G06F 21/577 726/22 |
| 2014/0358938 A1* | 12/2014 | Billmaier | .......... | G06F 17/30097 707/747 |

* cited by examiner

*Primary Examiner* — Vivek Srivastava
*Assistant Examiner* — Atta Khan
(74) *Attorney, Agent, or Firm* — Thomas | Horstemeyer, LLP

(57) ABSTRACT

Disclosed are various embodiments for browser-based scanning and matching of media items. Files identified by a user via a user interface element rendered by a browser are read by the browser, which can generate a fingerprint associated with the files. The fingerprint can be transmitted to a media scan service, which can provide an indication of whether the files match a media item maintained by a media storage service.

17 Claims, 7 Drawing Sheets

BROWSER-BASED MEDIA SCAN

BACKGROUND

Media storage services, such as a music or video "locker" service, can allow for storage of media in a network accessible storage service on behalf of a user. The media can be accessed via a computing device associated with an account of the user. For example, music can be streamed from a music locker service to a user's mobile device via a network. Accordingly, one way in which media can be established within a locker service in an account of the user involves the identification of media on a computing device of a user according to a fingerprint and signature. Once identified, the media can be associated with the user's account in the locker service without the need to actually upload or transmit copies of the media to the locker service from the user's computing device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to facilitating the identification of media stored on a device of a user so that the media can in turn be associated with an account of the user in a network accessible media storage service. Such a media storage service can comprise a "locker" service in which media, such as music, images, movies, or other types of content, is stored in a network accessible storage service maintained within a computing environment. The stored media can be accessible by the user from a computing device associated with the user's account, such as a mobile device, a tablet device, a personal computer, a set-top box, or any other device from which the user's account can be authenticated by the locker service.

A media scan tool may be distributed and installed on a computing device of a user in order to identify media that is stored on a device of the user, such as the user's personal computer, and upload copies of the media to the media storage service for later retrieval and/or streaming by the user from one or more other computing devices. In some embodiments of a media storage service, such a media scan tool can generate a fingerprint and/or signature of media stored on the device of the user, and a representation of the fingerprint or an identity of the media can then be transmitted to the locker service. Accordingly, the media storage service can then associate the identified media with the user's account without having to require the uploading of a copy of the media from the device of the user to the locker service. For example, the media scan tool can match a song title, artist, and/or other identifying information about a media item stored on the user's device with a database of media items that are maintained by and/or accessible to the locker service.

In other words, the locker service can maintain copies of one or more media items (e.g., a library of music), and create an entitlement that is associated with the user's account that authorizes the user to access copies of media items stored by the locker service that are identified as stored on the device of the user. The media items can then be streamed, downloaded, or otherwise accessed by a user via a computing device in communication with the locker service. In the context of the present disclosure, the process of identifying media items stored on a computing device associated with a user and matching the media items with those that are accessible to such a locker service is referred to as a scan and match process. A media storage service can, for example, employ such a scan and match service as a form of verification to determine whether the user possesses a copy of a particular media item before associating the media item with the user's account in the media storage service. Accordingly, embodiments of the present disclosure relate to providing a browser based solution for facilitating a scan and match process on behalf of a media storage service.

Figure 1A:
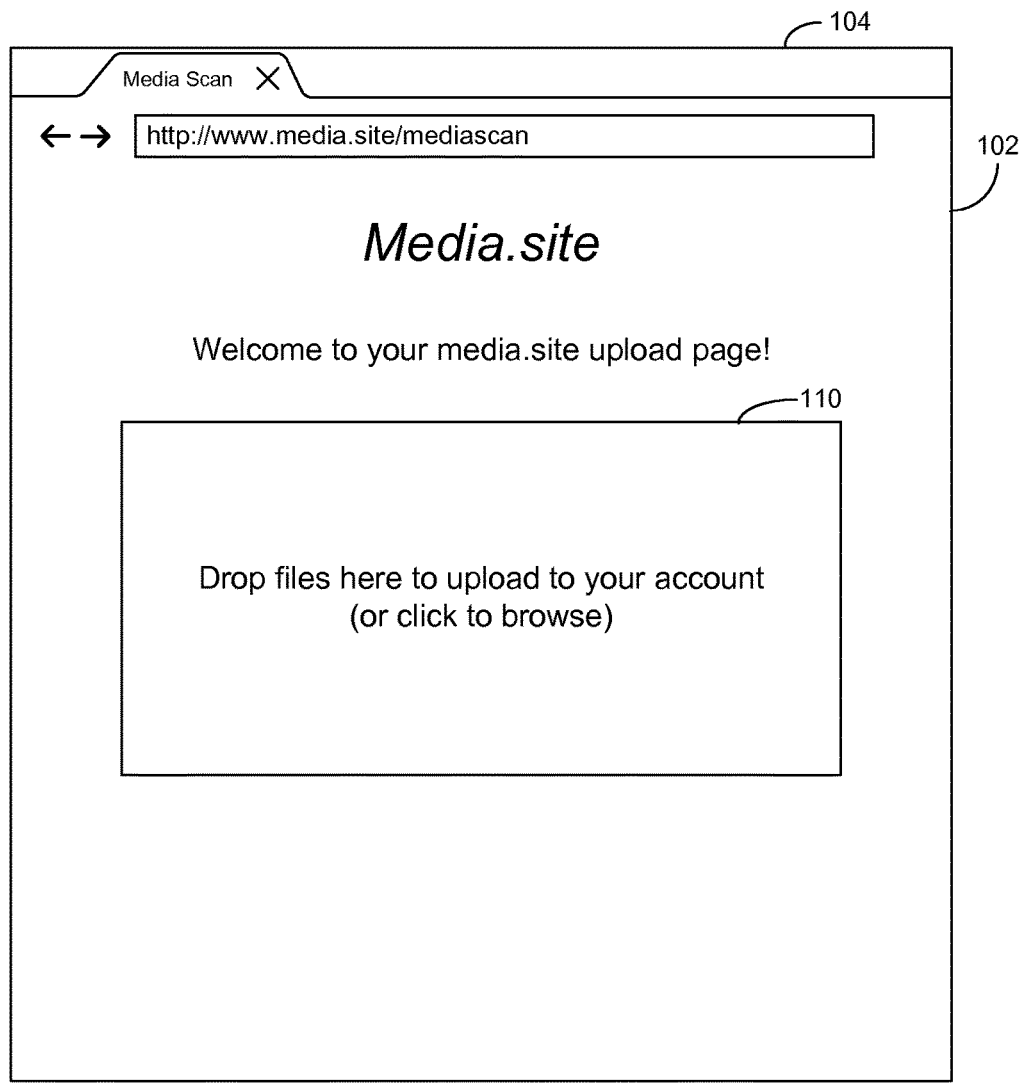
FIGS. 1A-1C are drawings of an example of a user interface according to various embodiments of the present disclosure.

Reference is now made to FIG. 1A, which depicts a user interface 100 according to various embodiments of the disclosure. The depicted user interface 100 represents a page 102 that can be rendered by a browser 104 executed by a client device of a user. The client device can represent any computing device of the user through with a site corresponding to the media storage service can be accessed. The depicted page 102 includes a drag-and-drop user interface element 110 that allows a user to identify files and/or directories that are located within a file system of the client device that the user desires to have associated with an account of the user within a media storage service.

Accordingly, the user may drag and drop files located within a file system accessible to a personal computer, mobile device, tablet device, or any other device upon which the browser is executed and the page 102 rendered. The page 102 is configured with page logic that can generate a fingerprint associated with the files identified by the user via the drag-and-drop user interface element 110 without having to interact with the media storage service. The page logic can read a portion of the file and calculating a digital fingerprint, which can include a process that results in a digital value that uniquely identifies a file with respect to other files that may be stored or archived with the media storage service. A digital fingerprint can also represent an acoustic fingerprint that is generated from a portion of a file that represents an audio and/or video file. As another example, a digital fingerprint can represent a video fingerprint that is generated from the portion of the file. No matter the type of fingerprint that can be generated from a portion of the file, such a fingerprint can allow the file to be uniquely identified as a media item that is stored within the media storage service with respect other media items stored within or accessible to the media storage service.

The page logic can read the portion of the file by employing portions of a JavaScript application programming interface (API). More specifically, the page logic can utilize the File API supported by certain JavaScript engines, the FileReader API supported by certain JavaScript engines, or other API's that allow page logic embedded with a browser page rendered by a browser to access a file that is stored on a file system accessible the machine on which the browser is executed.

As also shown in the page 102 rendered by a browser in FIG. 1A, the page 102 can prompt the user to download and/or install a software tool that can also perform scan and match capabilities on behalf of the media storage service as well as include a link to such a download. In this way, the page 102 provided by the media storage service can allow the user to immediately add files, representing media items, to his or her account as well as potentially download a software tool that can scan media stored on the computing device of the user and match the media with media items that are maintained by the media storage service.

Figure 1B:
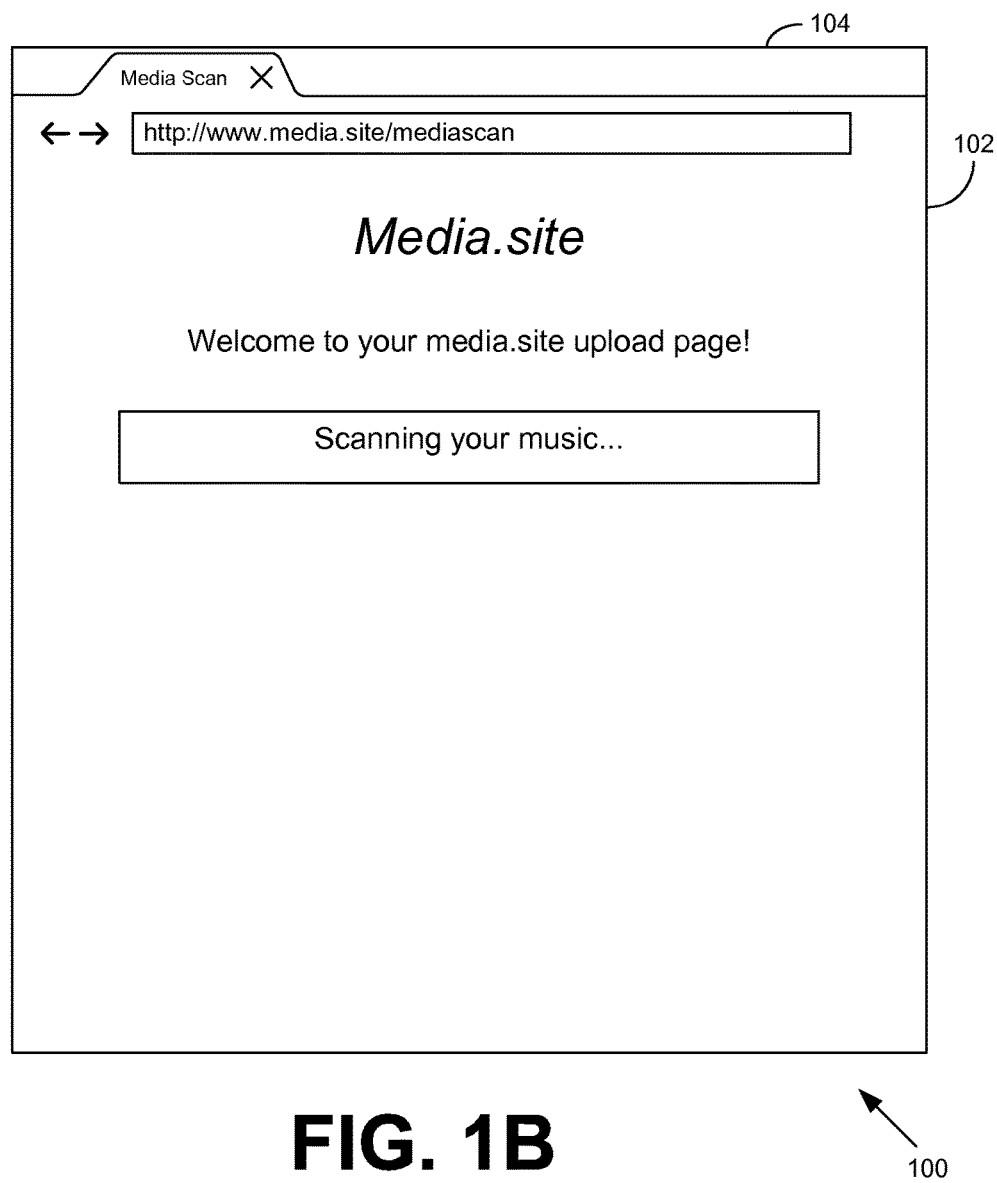

Reference is now made to FIG. 1B, which continues the example of FIG. 1A. In the user interface 100 shown in FIG. 1B, the user has dropped one or more files and/or directories onto the drag-and-drop user interface element 110 (FIG. 1A). In response, the page logic embedded within the page 102 executed by the browser 104 can calculate a fingerprint for the files to determine whether the fingerprint matches that of a media item within the media storage service. In some embodiments, the page logic can first determine whether the files are of an appropriate type, such as a type of media item supported by the media storage service. In some embodiments, the page logic can also analyze the files and/or another file stored on the client device of the user to determine whether an appropriate license is embedded within the file and/or elsewhere on the computing device indicating that the copy of the file is licensed to the user.

Accordingly, the page logic can then transmit a fingerprint that is generated based upon a file identified in the user interface to the media storage service, which can compare the generated fingerprint with those corresponding to media items stored in the media storage service. The media storage service can response to the page logic with a media title, artist, author and/or other identifying information.

Figure 1C:
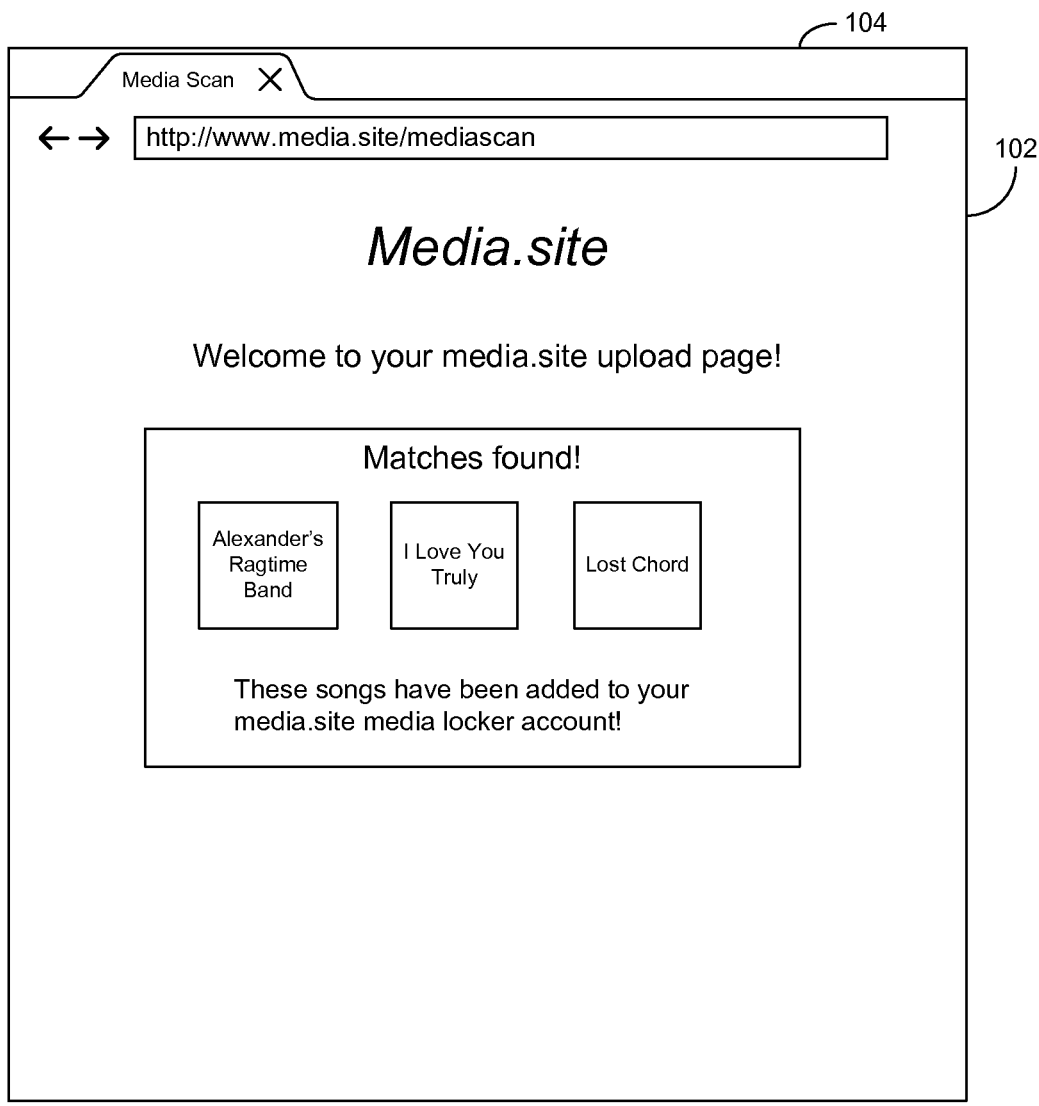

Continuing the example of FIG. 1B, FIG. 1C illustrates a result that can be rendered in the page 102 by the page logic executed by the browser 104 when the page 102 is rendered. As shown in FIG. 1C, the page logic has determined that, based upon an analysis of the fingerprint generated by the page logic corresponding to the files dropped by the user onto the drag-and-drop user interface element 110 (FIG. 1A), the files correspond to media items in the media storage service. Accordingly, the media storage service can respond to a request from the page 102 with identifying information associated with the media items, which can be rendered in the page 102 by the browser 104. The page 102 rendered by the browser 104 can be configured to asynchronously update its contents as the page logic embedded within the page 102 is executed. For example, after a user provides an indication of or identifies files via the drag-and-drop user interface element 110, the page logic embedded within the page 102 can generate fingerprints and transmit the fingerprints to the media storage service.

The page 102 can then asynchronously update its contents to indicate that it is analyzing the files as shown in FIG. 1B. Upon completion, the page 102 can asynchronously update its contents as shown in FIG. 1C to indicate whether the fingerprints match those of media items stored in the media storage service.

Figure 2:
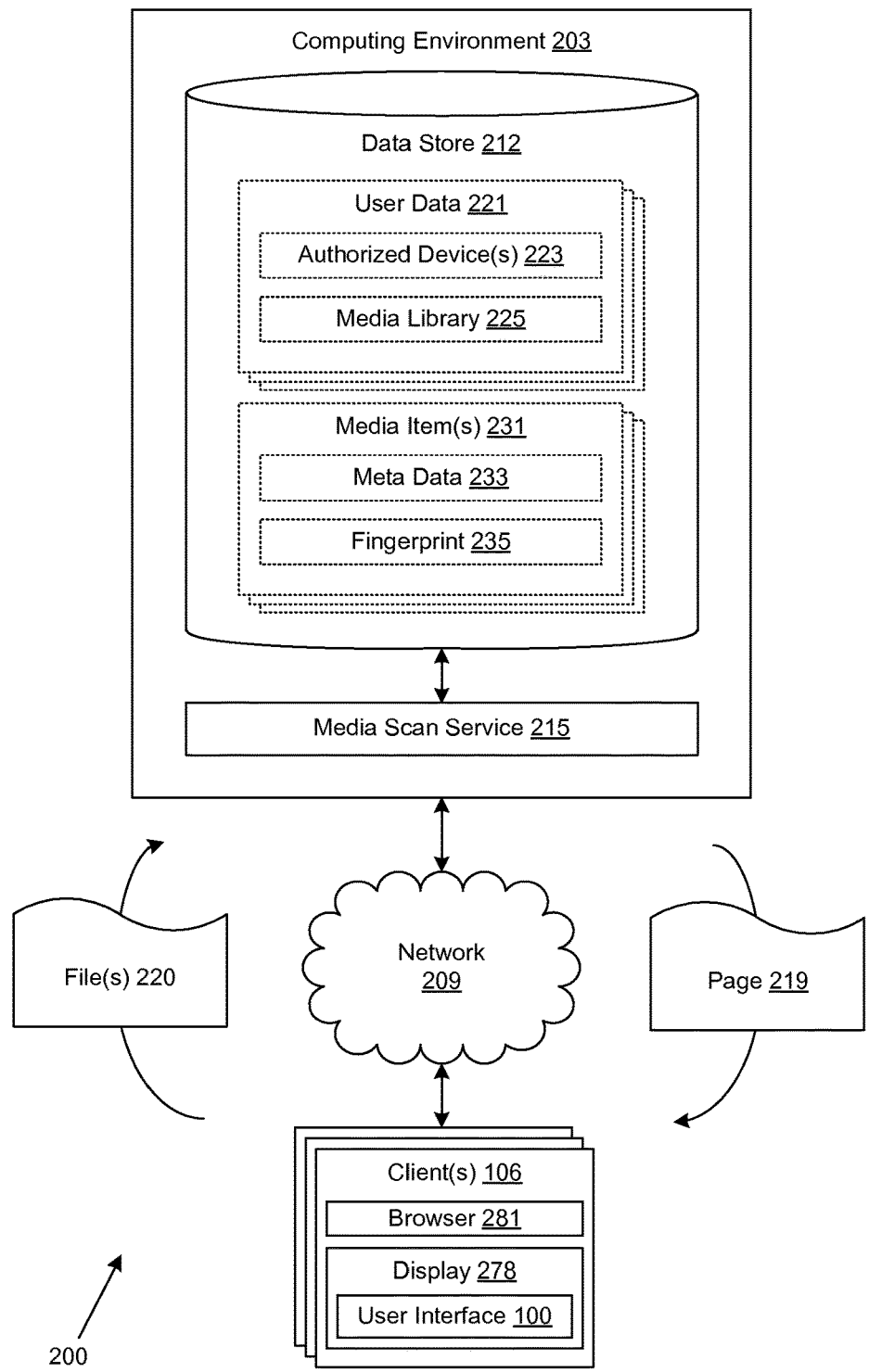
FIG. 2 is a drawing of a networked environment according to various embodiments of the present disclosure.

With reference to FIG. 2, shown is a networked environment 200 according to various implementations. The networked environment 200 includes a computing environment 203 as well as one or more client devices 106 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various implementations. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a media scan service 215 and other applications, services, processes, systems, engines, or functionality not discussed in detail herein. The media scan service 215 can comprise one component of a media storage service that provides the ability for users to download, stream and otherwise access media items 231 maintained by the media storage service. The media scan service 215 is executed in order to determine whether the fingerprints generated by page logic embedded in a page 102 and executed by a browser 281 in a client 106 correspond to media items 231 maintained by the media storage service. In some embodiments, the media scan service 215 can obtain a portion of a file 220 from page logic executed by a browser 281 and generate a fingerprint associated with the file to determine whether the fingerprint matches that of a media item 231 maintained by the media storage service. The media scan service 215 can also interact with a media scan tool that is executed outside of a browser by a client 106 and within a special purpose application to obtain fingerprints and/or an identity of a media item that is identified as stored on a client 106 associated with a user.

The data stored in the data store 212 includes, for example, user data 221 and media items 231. User data 221 corresponds to user accounts associated with users of a media storage service facilitated by the computing environment 203. The user data 221 can include payment information, contact information, user identifiers, authentication information of users, or other data as can be appreciated. User data 221 can also include information about authorized devices 223. For example, a media storage service may allow media items associated with a user account to be associated with a maximum number of authorized devices, such as personal computers, mobile devices, tablet devices, or other devices as can be appreciated. Accordingly, data associated with authorized devices 223 can include a media access control (MAC) address of a device, or any other identifier with which a device can be uniquely identified with respect to other authorized devices 223.

User data 221 can also include information about a media library 225 associated with a particular user. The media library 225 can identify one or more media items 231 that a user is entitled to download, stream or otherwise access via an authorized device 223. As noted above, a media item 231 can include music, movies, or any other media as can be appreciated.

The data store 212 can also include information about media items 231. Media items 231 can be maintained by a media storage service and accessed by users via an authorized device 223. Media items 231 can be associated with various meta data 233, such as artist information, genre data, a title, description, album cover art, or any other associated with a media item 231 as can be appreciated. Media items 231 correspond to songs, albums, movies, images, or other forms of media that can be stored by a media storage service and made accessible to users for download, streaming or other forms of access via the network 209.

Media items 231 can also be associated with a fingerprint 235 with which a media item 231 can be uniquely identified with respect to other media items 231. Such a fingerprint 235 can be an acoustic fingerprint that is generated based the audio data corresponding to a particular media item 231. A fingerprint 235 can also include a video fingerprint based upon video data corresponding to the media item 231. A fingerprint 235 can also include a digital fingerprint based upon the bits of a file corresponding to the media item 231. A fingerprint can also include any combination of the above.

The client device 106 is representative of a plurality of client devices that may be coupled to the network 209. The client device 106 may comprise, for example, a processor-based system such as a computer system. Such a computer system may be embodied in the form of a handheld device having an integrated barcode scanner and display, a handheld device having an integrated image capture device and display, a desktop computer, a laptop computer, personal digital assistants, cellular telephones, smartphones, set-top boxes, music players, web pads, tablet computer systems, game consoles, electronic book readers, or other devices with like capability. The client device 106 may include a display 278. The display 278 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The client device 106 may be configured to execute various applications such as a browser 281 and/or other applications. The browser 281 may be executed in a client device 106, for example, to access network content served up by the computing environment 203 and/or other servers, thereby rendering a user interface 100 on the display 278. The client device 106 may also execute, for example, a special purpose mobile application, etc., and the user interface 284 may correspond to a network page, a mobile application screen, etc. The client device 106 may be configured to execute applications beyond the browser 281 such as, for example, mobile applications, email applications, social networking applications, and/or other applications. The browser 281 is configured to support a JavaScript API including the File API and/or FileReader API that provides support for reading files that are stored on a file system accessible to the client device 106. In this way, a page rendered by the browser 281 can include page logic that can generate a fingerprint by accessing files that are identified by the user within a user interface rendered by the browser 281.

Embodiments of the disclosure can facilitate a scan and match tool that analyzes media stored on a client device 106 within a browser. In other words, scan and match functionality can be provided by page logic embedded in a page 219 that is transmitted from the media scan service 215 and rendered by the browser 281. The page logic executed by the browser 281 that is embedded within a page can render a user interface element with which a user can identify one or more files. Upon rendering such a user interface element and receiving an indication of one or more files from the user, the page logic can then generate a fingerprint associated with an identified file and transmit the fingerprint to the media scan service 215. Subsequently, the media scan service 215 can respond with an identification of one or more media items 231 that correspond to the fingerprint.

In some embodiments of the disclosure, the page logic executed by a browser 281 can read or access at least a portion of a file identified by a user via the user interface element and transmit the file 220 or a portion thereof to the media scan service 215. The file(s) identified by the user can be read by page logic executed by the browser via a JavaScript API available to the page logic that can, for example, provide read-only access to files that are stored locally on the file system of the client 106. In some embodiments, another type of API can be made available to page logic executed by the browser 281 that allows the page logic embedded in a page 219 to access file(s) that are stored locally on the file system of the client 106. In other words, such an API can provide direct access to such files so that the page logic can either generate a fingerprint associated with the file or transmit a portion of the file to the media scan service 215. In response to receiving the file 220 and/or a portion thereof, the media scan service 215 can then generate a fingerprint associated with the file to determine whether the file corresponds to a media item 231.

If the file does correspond to a media item 231, the media scan service 215 can associate the media item 231 with a user account of the user in the user data 221. In other words, the media scan service 215 can create an entitlement associated with the media item 231 that allows the user to download, stream or otherwise access the media item 231 via the media storage service. Additionally, in some embodiments, the logic embedded in a page and executed by the browser 281 can also detect a number of files selected by the user via a user interface element and prompt the user to download a native scan and match tool that is installed on the client 106 if the number of files selected by the user meets or exceeds a threshold. In this way, should the user attempt to select a large number of files, the page logic can prompt the user to install a potentially more efficient native scan and match software tool.

The page can also be embedded with logic that determines whether the client 106 is an authorized device 223 associated with the user data 221 of a user account. A user can provide authentication credentials, such as a username/password pair, with which the media scan service 215 can identify a user account of the user. In this way, the media scan service 215 can identify an appropriate user account with which the associate a given media item 231. Additionally, the media storage service may restrict a user account so that a user may only add media items 231 from specific authorized devices 223 that are associated with the user's account. Accordingly, the page logic executed by the browser 281 can identify the client 106 via a MAC address, an identifier embedded within a browser cookie, IP address, or any other identifier or combination thereof, to determine whether the user is attempting to add media items 231 to an account of the user from an authorized device 223.

If the identifier associated with the client 106 does not correspond to an authorized device 223, the media scan service 215 can send a page 219 to the client 106 that prompts the user to add the client 106 as an authorized device. In some embodiments, the media scan service 215 can deny association of media items 231 with the user account if, for example, the user has reached a maximum allowable number of authorized devices 223 with which the user's account may be associated.

Figure 3:
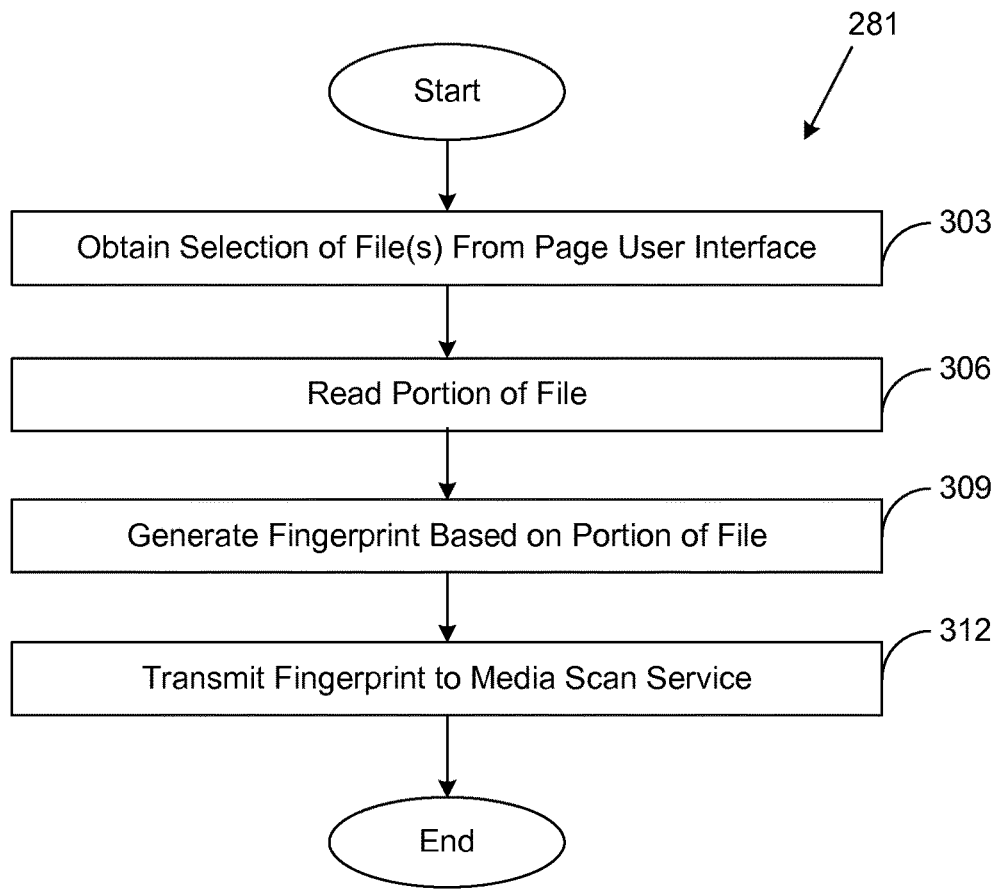
FIG. 3 is a flowchart illustrating one example of functionality implemented as portions of a browser executed in a client in the networked environment of FIG. 1 according to various embodiments of the present disclosure.

Referring next to FIG. 3, shown is a flowchart that provides one example of the operation of a portion of the browser 281 when executing page logic embedded in a page 219 according to various embodiments. It is understood that the flowchart of FIG. 3 provides merely an example of the many different types of functional arrangements that may be employed to implement the operation of the portion of the browser 281 as described herein. As an alternative, the flowchart of FIG. 3 may be viewed as depicting an example of steps of a method implemented in the client 106 (FIG. 1) according to one or more embodiments.

Beginning with box 303, the browser 281 receives a selection of one or more file stored on a client device 106 from a user interface element embedded in a page 219 rendered by the browser 281. In box 306, the browser 281 reads a portion of the one or more files. Next, in box 309, the browser 281 generates a fingerprint associated with the files based upon the portion of the file that is read by the browser. At box 312, the browser 281 transmits the fingerprint to the media scan service 215. In some embodiments, the media scan service 215 can respond with an indication of whether the fingerprint matches that of a media item maintained by the media storage service facilitated by the computing environment 203.

Figure 4:
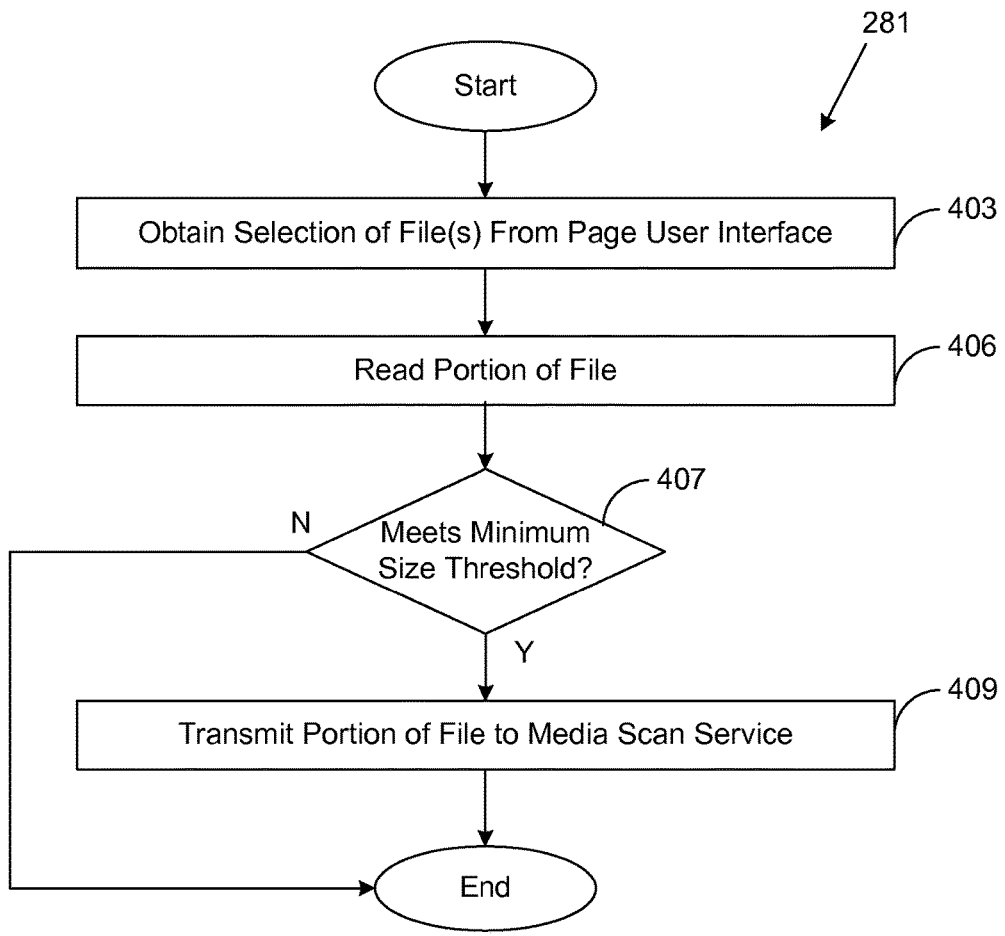
FIG. 4 is a flowchart illustrating one example of functionality implemented as portions of a browser executed in a client in the networked environment of FIG. 1 according to various embodiments of the present disclosure.

Referring next to FIG. 4, shown is a flowchart that provides one example of the operation of a portion of the browser 281 when executing page logic embedded in a page 219 according to various embodiments. It is understood that the flowchart of FIG. 3 provides merely an example of the many different types of functional arrangements that may be employed to implement the operation of the portion of the browser 281 as described herein. As an alternative, the flowchart of FIG. 3 may be viewed as depicting an example of steps of a method implemented in the client 106 (FIG. 1) according to one or more embodiments.

Beginning with box 403, the browser 281 receives a selection of one or more file stored on a client device 106 from a user interface element embedded in a page 219 rendered by the browser 281. In box 406, the browser 281 reads a portion of the one or more files. Next, at box 407, the browser 281 can determine whether the portion of the file meets a minimum size threshold. At box 409, if the read portion of the file meets the minimum size threshold, the browser 281 transmits the portion of the file to the media scan service 215. If not, the process proceeds to completion.

Figure 5:
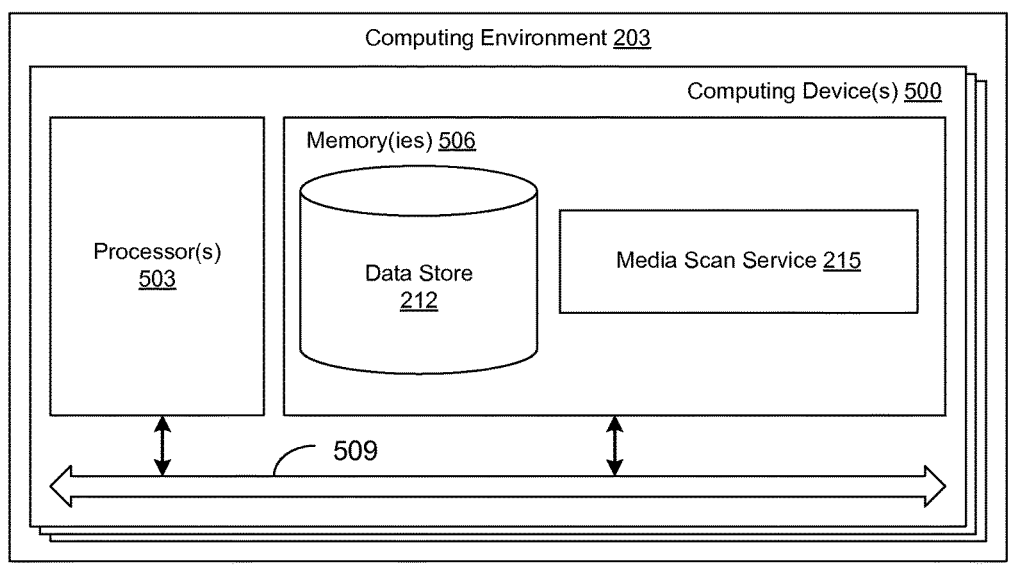
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500.

Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is the media scan service 215 and potentially other applications. Also stored in the memory 506 may be a data store 212 and other data. In addition, an operating system may be stored in the memory 506 and executable by the processor 503. The computing environment 106 (FIG. 1) may be implemented similarly to the computing environment 103.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the media scan service 215, the browser 281 (FIG. 1), or page logic executed by the browser 281, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4 show the functionality and operation of an implementation of portions of the browser 281 executing page logic embedded in a page 219 rendered by the browser. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the browser 281 and media scan service 215 that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the media scan service 215, the browser 281, or any other logic, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying instructions executable by a browser in a computing device, the instructions comprising JavaScript code embedded within a browser page rendered by the browser that, when executed by the browser, causes the computing device to at least:

obtain an identification of a directory from a user interface, the directory within a file system of the computing device;
identify a plurality of files within the directory;
determine whether the computing device is an authorized device associated with a user account of a particular user in a media storage service based upon at least a media access control (MAC) address of the computing device, the media storage service executed by a computing environment accessible to the computing device over a network;
read a portion of individual ones of the plurality of files using a JavaScript File Application Programming Interface (API) or a JavaScript FileReader API;
generate a respective fingerprint associated with the individual ones of the plurality of files based at least in part on the portion, the respective fingerprint comprising a digital value that uniquely identifies the individual ones of the plurality of files;
determine whether the respective fingerprint corresponds to a respective media item stored in a media storage system; and
transmit a request to the media storage system to associate the respective media item with the user account within the media storage service without requiring uploading of the individual ones of the plurality of files from the computing device to the media storage system.

2. The non-transitory computer-readable medium of claim 1, wherein the instructions correspond to a plug-in for a browser.

3. A system, comprising:
a computing device; and
a browser application executed in the computing device, the browser application rendering a page, the page, when rendered by the browser application, comprising JavaScript code embedded within the page that causes the browser application to at least:
   obtain an indication of a file via a user interface rendered by the browser application;
   determine whether the computing device is an authorized device associated with a user account of a particular user in a media storage service based upon at least a media access control (MAC) address of the computing device, the media storage service executed by a computing environment accessible to the computing device over a network;
   read a portion of the file using a JavaScript File Application Programming Interface (API) or a JavaScript FileReader API;
   generate a fingerprint from the portion of the file within the browser, the fingerprint comprising a digital value that uniquely identifies the file from a plurality of media files;
   transmit the fingerprint of the file from the browser to the media storage service provided by a computing environment in response to a determination that the computing device is the authorized device;
   cause a media item corresponding to the file within a media storage service to be associated with a user account within the media storage service without requiring uploading of the file from the computing device to the media storage system.

4. The system of claim 3, wherein the portion of the file comprises code that is executed by the browser application.

5. The system of claim 3, wherein the media item comprises one of: an image, a song or a movie.

6. The system of claim 3, wherein the fingerprint uniquely identifies the media item with respect to other media items indexed by the media storage service.

7. The system of claim 3, wherein the file further comprises a directory of a file system associated with the computing device.

8. The system of claim 7, wherein the indication of the file is obtained by rendering a drag-and-drop user interface element in which the file can be dropped.

9. The system of claim 8, wherein the page further comprises JavaScript code that prompts the user to install a scan and match tool when the file comprises a threshold number of a plurality of files.

10. The system of claim 3, wherein the page further comprises JavaScript code that denies association of the file with the user account when the computing device is an unauthorized device associated with the user account.

11. A method, comprising:
obtaining, by at least one computing device, an identification of a file via a drag-and-drop user interface element rendered by a browser application executed by the at least one computing device, the browser application executing JavaScript executable code embedded within a browser page;
determining, by the at least one computing device, whether the at least one computing device is an authorized device associated with a user account of a particular user in a media storage service based upon at least a media access control (MAC) address of the at least one computing device, the media storage service executed by a computing environment accessible to the at least one computing device over a network;
reading, by the at least one computing device, a portion of the file by the browser application using a JavaScript File Application Programming Interface (API) or a JavaScript FileReader API;
generating, by the at least one computing device, a fingerprint associated with the portion of the file within the browser application, the fingerprint comprising a digital value that uniquely identifies the file from a plurality of media files;
transmitting, by the at least one computing device, the fingerprint of the file to the media storage service; and
causing, by the at least one computing device, a media item corresponding to the file within the media storage service to be associated with a user account within the media storage service without requiring uploading of the file from the at least one computing device to the media storage system.

12. The method of claim 11, wherein reading the portion of the file by the browser application is performed via an application programming interface (API) accessible to page logic executed by the browser application.

13. The method of claim 11, wherein the method is performed via page logic embedded in a page rendered by the browser.

14. The method of claim 11, wherein the fingerprint is generated by the browser application and the browser application further identifies a media item corresponding to the file based at least in part upon the fingerprint.

15. The method of claim 14, wherein the media item is associated with the user account of a user in the media storage service.

16. The method of claim 14, wherein the fingerprint uniquely identifies the media item with respect to other media items indexed by the media storage service.

17. The method of claim 11, wherein transmitting, by the at least one computing device, the fingerprint of the file to the media storage service further comprises transmitting the fingerprint of the file to the media storage service in response to a determination that the portion of the file meets a minimum size threshold.

* * * * *